United States Patent
Harper et al.

(10) Patent No.: US 8,645,220 B2
(45) Date of Patent: Feb. 4, 2014

(54) METHOD AND SYSTEM FOR CREATING AN AUGMENTED REALITY EXPERIENCE IN CONNECTION WITH A STORED VALUE TOKEN

(75) Inventors: Andrew Harper, Dallas, TX (US); Mackenzie Squires, Dallas, TX (US); Randy Lee Bradshaw, Sachse, TX (US)

(73) Assignee: Homer TLC, Inc., Wilmington, DE (US)

( * ) Notice: Subject to any disclaimer, the term of this patent is extended or adjusted under 35 U.S.C. 154(b) by 821 days.

(21) Appl. No.: 12/549,618

(22) Filed: Aug. 28, 2009

(65) Prior Publication Data

US 2011/0055049 A1 Mar. 3, 2011

(51) Int. Cl.
*G06Q 30/00* (2012.01)

(52) U.S. Cl.
USPC .................. 705/26.1; 705/14.1; 705/14.23

(58) Field of Classification Search
USPC .............................................. 705/26.1–27.2
See application file for complete search history.

(56) References Cited

U.S. PATENT DOCUMENTS

| | | | |
|---|---|---|---|
| 6,880,755 B2 | 4/2005 | Gorbet et al. | |
| 7,170,492 B2 | 1/2007 | Bell | |
| 7,348,963 B2 | 3/2008 | Bell | |
| 7,487,118 B2 | 2/2009 | Crutchfield, Jr. et al. | |
| 2003/0062675 A1 | 4/2003 | Noro et al. | |
| 2006/0038833 A1 | 2/2006 | Mallinson et al. | |
| 2007/0050712 A1 | 3/2007 | Hull et al. | |
| 2007/0165904 A1 | 7/2007 | Nudd et al. | |
| 2007/0247422 A1 | 10/2007 | Vertegaal et al. | |
| 2008/0071559 A1* | 3/2008 | Arrasvuori | 705/1 |
| 2008/0247678 A1* | 10/2008 | Okamoto et al. | 382/306 |
| 2008/0263459 A1 | 10/2008 | Altberg et al. | |
| 2010/0049632 A1* | 2/2010 | Friedman | 705/27 |
| 2011/0276379 A1* | 11/2011 | Shaw et al. | 705/14.17 |
| 2012/0011025 A1* | 1/2012 | Hunt | 705/26.41 |

OTHER PUBLICATIONS

"Hollywood Entertainment and Musicmatch Choose Vesta's Stored Value Solutions" PR Newswire [New York] May 25, 2004: 1. Retreived via ProQuest on Sep. 22, 2013.*

* cited by examiner

*Primary Examiner* — Michael Misiaszek
(74) *Attorney, Agent, or Firm* — Fulbright & Jaworski LLP

(57) ABSTRACT

A method and system for creating an augmented reality experience in connection with a stored value token comprises augmented reality software which can be loaded on a general purpose computer. This augmented reality software can be downloaded from an external source, such as the Internet. The augmented reality software may monitor camera signals in order to detect a marker on a stored value token. The augmented reality software tracks the position of this marker relative to camera. The augmented reality software can produce an object which is projected on the image captured by the camera and adjacent to the image of the marker. The projected object can have three dimensions as it is projected on a two dimensional display. In response to certain conditions, the projected object may later be changed so that it contains a graphical item related to the value associated with the stored value token.

20 Claims, 13 Drawing Sheets

METHOD AND SYSTEM FOR CREATING AN AUGMENTED REALITY EXPERIENCE IN CONNECTION WITH A STORED VALUE TOKEN

FIELD OF THE INVENTION

The invention generally relates to stored value tokens and computers. More particularly, the invention relates to an augmented reality experience produced by a computer in connection with a stored value token.

BACKGROUND

Stored value tokens that include, but are not limited to, gift cards, are often purchased such that the intended recipient of the gift card may use the value associated with the gift card to purchase one or more consumer products. When an intended recipient receives a gift card, the recipient may not have an immediate idea of what consumer product that he or she may want to purchase with the gift card.

In other instances, depending upon the value associated with a gift card, the gift card recipient may be able to purchase a number of consumer products with the gift card. With this ability to purchase many different consumer products with the gift card, the gift card recipient may not be able to decide on which consumer product should be purchased with the gift card.

In addition to these problems, another problem with gift cards is that they lack the flair or impact that a traditional gift may have on a person. In other words, most gift recipients become excited when they receive a package that is gift wrapped. The ability to hold an object in a person's hand and not know what the object is because it is hidden by gift wrapping can be exciting for a gift recipient.

Meanwhile, an individual may not be very enthusiastic when receiving a gift card. Gift cards can be uninteresting relative to a traditional package type gift. Also, many gift cards provide their exact value with a writing or label that is provided on the card. This identification of the exact value for a gift card may detract from the impact that a gift card may have on a recipient since there are no unknowns with respect to the gift.

Accordingly, there is a need in the art for a method and system that can suggest consumer goods which may be purchased with a gift card. Further, there is a need in the art for a method and system that can add flare or excitement to a gift card experience from the perspective of the gift card recipient.

SUMMARY

A method for creating an augmented reality experience on a display device comprises capturing streaming video images with a camera that is coupled to a client device. The streaming video images can be displayed on a display device which is also coupled to the client device. The video images can be scanned for a marker present on a stored value token. Next, a position of the marker relative to the camera from the video images can be determined. If the marker is in a predetermined position, then an object having perspective can be generated and displayed adjacent to the marker. If the marker is moved from the predetermined position and then returned to this predetermined position, then the object can be generated and displayed adjacent to the marker and containing a graphical item that is associated with a price which is one of less than and equal to a value associated with the stored value token.

According to another exemplary aspect, a method for creating an augmented reality experience on a display device comprises receiving a value to associate with a stored value token. Next, a database can be searched for one of products and services that are sold for close to the value. Then, at least one of a product and a service can be matched which is sold at close to the value. A record comprising the token identifier and a graphical item representing one of the product and service that is found during matching can be created. Next, a request to initiate the augmented reality experience can be received. In response to the request, one or more files comprising augmented reality data and the record comprising the graphical item can be assembled. Subsequently, the one or more files can be sent over a computer network.

According to a further exemplary aspect, a computer system for creating an augmented reality experience on a display device, can comprise a processing unit, a memory storage device, and a display device coupled to the processing unit for displaying data. The system can also include a program module, stored in the memory storage device for providing instructions to the processing unit. The processing unit is responsive to the instructions of the program module and is operable for capturing streaming video images with a camera coupled to a client device and displaying the streaming video images on the display device. The processing unit is also operable for scanning the video images for a marker present on a stored value token and determining a position of the marker relative to the camera from the video images. If the marker is in a predetermined position, then an object having perspective is generated and displayed adjacent to the marker. If the marker is moved away from this predetermined position and then returned to this predetermined position, then the object is generated and displayed adjacent to the marker and such that it contains a graphical item that is associated with a price which is one of less than and equal to a value associated with the stored value token.

DETAILED DESCRIPTION

Figure 1:
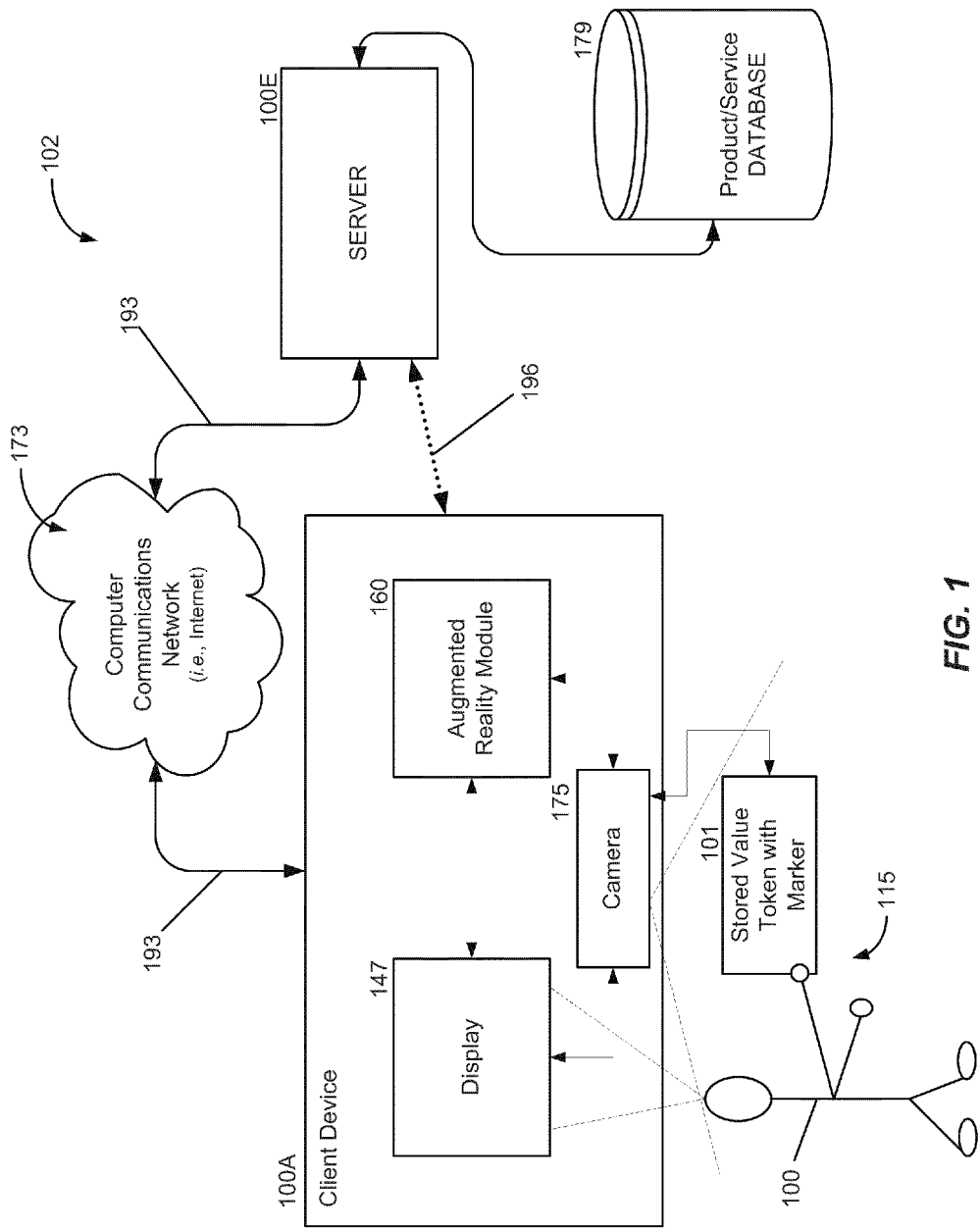
FIG. 1 is a functional block diagram of a computer system for creating an augmented reality experience in connection with a stored value token according to an exemplary embodiment of the invention.

A method and system for creating an augmented reality experience in connection with a stored value token comprises augmented reality software which can be loaded on a general purpose computer. This augmented reality software can be downloaded from an external source, such as the Internet. The augmented reality software may monitor signals generated from a camera which is coupled to the same computer that is executing the augmented reality software. The augmented reality software monitors the camera signals in order to detect a marker on a stored value token. The augmented reality software tracks the position of this marker relative to the camera. The augmented reality software can produce an object which is projected on the image captured by the camera. The projected object is also positioned adjacent to the image of the marker that is captured by the camera.

As the stored value token having the marker is moved in front of the camera, the marker in the image captured by the camera also moves. The augmented reality software tracks the movement of the marker within the image and positions the object adjacent to the marker in the image. When the marker is physically manipulated in a predetermined manner, such as when positioning the marker so that a normal of a geometric planar surface containing the marker is at approximately ninety degrees relative to a geometric plane defined by the plane of view produced by the camera, the augmented reality software changes a property of the object.

As a non-limiting example, when the image of the stored value token containing a marker is captured by the camera, the augmented reality software can produce a three dimensional box such that the box appears to have three dimensions as it is projected on a two dimensional display. Specifically, when the marker is oriented such that a normal of a geometric plane defined by the marker is at an approximate ninety degree angle relative to a geometric plane defined by the view of the camera, the augmented reality software can produce a three-dimensional box.

When the marker is removed from view or can no longer be detected by the camera and then reintroduced into the view of the camera, the augmented reality software places a graphical item representing a consumer product or service within a two-dimensional box.

The graphical item can be selected from one or more product or service images that are directly related to the value associated with the stored valued token. That is, only products or services that can be purchased based on the value of the stored value token will have graphical items displayed within the two-dimensional box that is positioned adjacent to the stored value token. However, images of other products or services which are priced significantly above the value associated with the stored value token could be presented so that the token user could be prompted with the opportunity to add more value to the account associated with the stored value token.

The augmented reality software can be linked to other software components that can produce images of other products that are related to the product displayed in the three-dimensional box. The images of the other products may contain hypertext links so that when they are selected, then additional information or details may be presented on a display for a selected product.

Referring now to the drawings, in which like reference numerals denote like elements, FIG. 1 is a functional block diagram of a computer system 102 for creating an augmented reality experience in connection with a stored value token 101 according to an exemplary embodiment of the invention. The stored value token 101 can take on various forms of a financial instrument card. For example, the stored value token 101 can comprise at least one of a gift card, credit card, an atm or debit card, and other financial instrument cards.

The computer system 102 can comprise a server 100E which can be coupled to a network 173 that can comprise a wide area network ("WAN"), a local area network ("LAN"), the Internet, or a combination of networks. The server 100E can be coupled to a product/service database 179. The product/service database 179 can store various records related to products and/or services which may be available for purchase with a stored value token 101.

The server 100E can comprise any type of computer server. For example, the server 100E can comprise a Linux based operating system and can process pages processed by the Ruby on Rails framework. Ruby on Rails is written and ran under libraries written in the Ruby API. The Ruby on Rails framework is served requesting using the Apache Webserver. The Ruby on Rails Framework provides an ORM library. The database 179 can comprise a MySQL server. Exemplary server application specifications, include, but are not limited to the following: RedHat Enterprise Linux 5; Apache 2.2; Ruby 1.8; and Ruby On Rails 2.3.3. Other hardware and software for the server 100E and the product/service database 179, other than those described, are not beyond the scope of the invention.

The server 100E can be coupled to the network 173. Through the network 173, the server 100E can communicate with various different client devices 100A that can include desktop or laptop computers and other devices.

Each client device 100A can run or execute web browsing software in order to access the server 100E and its various applications, such as a product catalog and a downloadable augmented reality module 160. The client devices 100A can take on many different forms such as desktop computers, laptop computers, handheld devices such as personal digital assistance ("PDAs"), in addition to other smart devices such as cellular telephones. Any device which can access the network 173 can be a client computer device 100A according to the computer system 102. The client devices 100A can be coupled to the network 173 by various types of communication links 193. These communication links 193 can comprise wired as well as wireless links. The communication links 193 allow each of the client devices 100A to establish virtual links 196 with the server 100E.

Each client device 100A preferably comprises a display 147 and a camera 175. The camera 175 can capture a real world scene 115 that includes a user 110 holding a stored value token 101. The real world scene 115 can be displayed on the display device 147.

The display 147 can comprise any type of display device such as a liquid crystal display (LCD), a plasma display, an organic light-emitting diode (OLED) display, and a cathode ray tube (CRT) display. The camera 175 can comprise a video camera such as a webcam. The camera 175 can be a CCD (charge-coupled device) camera or a CMOS (complementary metal-oxide-semiconductor) camera. The camera 175 can provide a VGA-resolution at a frame rate of at least thirty frames per second. The camera 175 can also produce video in multi-megapixel resolutions, and it can run at high frame rates on the order of 320×240 video at one-hundred twenty frames per second. However, other frame rates higher or lower than those disclosed for the camera 175 are within the scope of the invention. Similarly, other resolutions higher or lower than those disclosed for the camera 175 are within the scope of the invention.

The client device 100A can execute or run an augmented reality module 160. The augmented reality module 160 comprises a multimedia platform that can be part of a plug-in for an Internet web browser. According to one exemplary embodiment, a multimedia platform is currently distributed under the Adobe brand Flash Player. A plug-in is sold currently under the name Adobe brand Flash Player. The multimedia platform can manipulate vector and raster graphics, and can support bidirectional streaming audio and video. The multimedia platform may contain a scripting language known, as of this writing, as Action Script. The augmented reality module 160 typically comprises files formatted in the "SWF" format, traditionally called "ShockWave Flash" movies, "Flash movies" or "Flash games and usually have a .swf file extension.

The augmented reality module 160 may be an object of a web page, "played" in a Flash Player, or incorporated into a projector, a self-executing Flash movie (with the .exe extension in MICROSOFT Windows or .hqx for APPLE Macintosh). Flash Video files, as of this writing, have a .flv file extension and are either used from within .swf files or played through a fly-aware player, such as (VLC), or QuickTime and Windows Media Player with external codecs added.

The augmented reality module 160 may be created and programmed in an integrated development environment (IDE) that is built on a multi-language software development platform, like those currently sold and that utilize the Eclipse platform, such as Flex Builder 3 which has been recently renamed to Adobe brand flash builder 4. Further details of the augmented reality module 160, including an exemplary architecture for the software, are illustrated in FIG. 8 and will be discussed in further detail below.

The augmented reality module 160 is designed to work with the camera 175, the display 147, and the stored value token 101 having a marker 105 in order to produce live video on the display 147. In addition, computer generated animation is superimposed on the live video signals that are being sent to the display 147. Specifically, the augmented reality module 160 monitors signals from the camera 175 in order to detect the marker 105 which is present on the stored value token 101. Once the marker 105 is detected by the augmented reality module 160, the augmented reality module 160 tracks the position of this marker 105 relative to the camera 175.

The augmented reality module 160 can produce an object 207 (FIG. 3) which is projected on the image captured by the camera 175. The object 207 can be positioned adjacent to the image of the marker 105 that is captured by the camera 175. As the stored value token 101 is moved in front of the camera 175, the marker 105 in the image captured by the camera 175 also moves. The augmented reality module 160 tracks the movement of the marker 105 within the image and positions the object 207 adjacent to the marker 105 in the image. Based on certain movements of the marker 105, the augmented reality module 160 can produce the object 207 or a graphical item 405 that is positioned adjacent to the marker 105 of the stored value token 101. Further details of this augmented reality experience produced by the augmented reality module 160 are illustrated in FIGS. 2 through 6 and are discussed in further detail below.

Figure 2:
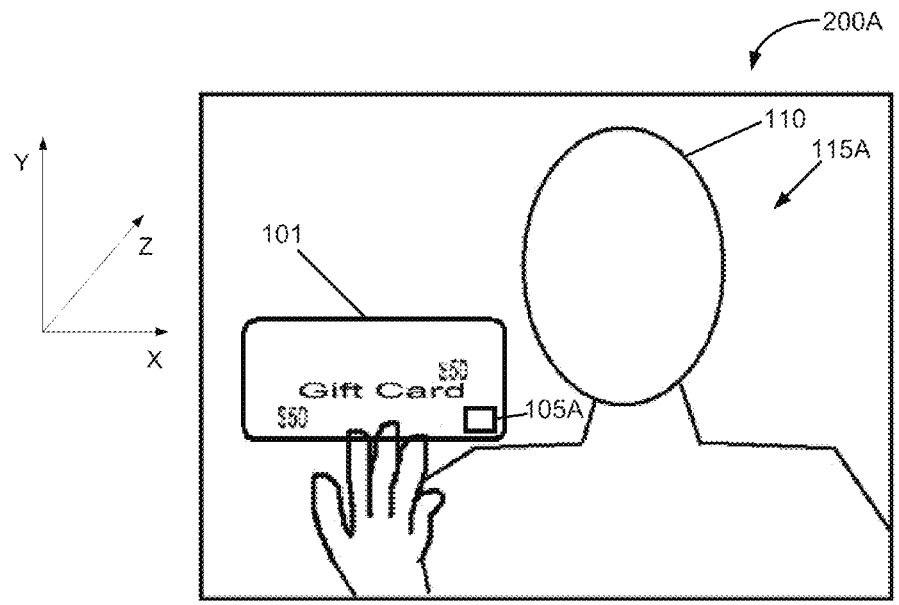
FIG. 2 is an exemplary computer display of a user interface which projects a real world scene comprising a stored value token without any augmentation according to an exemplary embodiment of the invention.

FIG. 2 is an exemplary computer display 200A of a graphical user interface which projects a real world scene 115A comprising a stored value token 101 without any augmentation or projected images according to an exemplary embodiment of the invention. The real world scene 115A is a moving video image produced by the camera 175. The scene 115A captured by the camera 175 in the exemplary embodiment illustrated in FIG. 2 comprises a user 110, which is a person, and the token 101 being held by the user 110.

Figure 9:
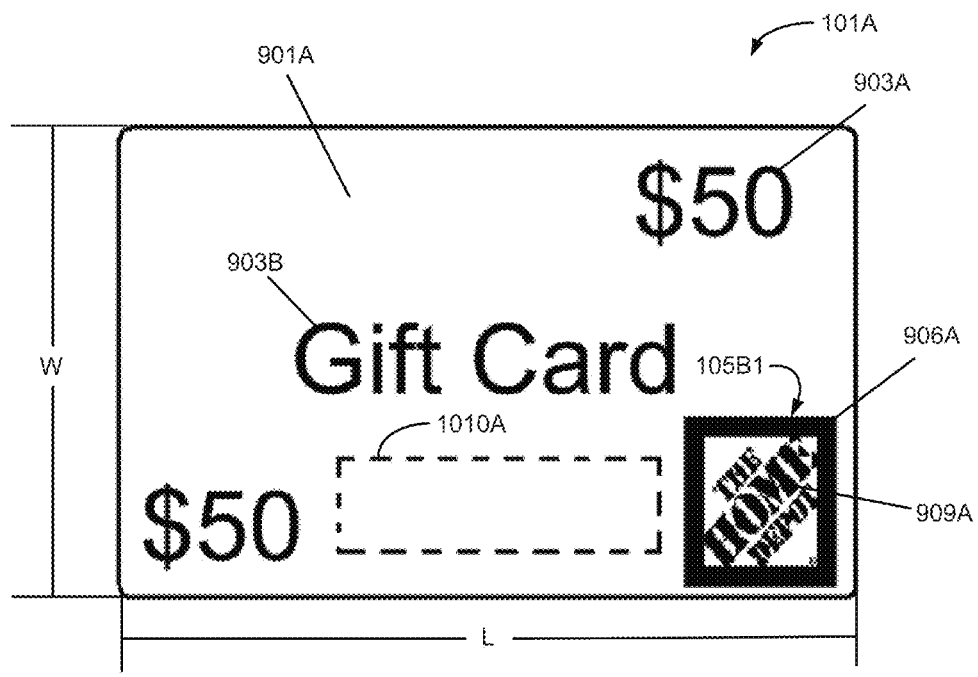
FIG. 9 is a first side view of an exemplary stored value token according to an exemplary embodiment of the invention.

The augmented reality module 160 will search the entire image within the display 200A for the marker 105A which is positioned on the stored value token 101. According to the exemplary embodiment illustrated in FIG. 2, the stored value token 101 comprises a gift card having a rectangular shape. The computer system 102 is not limited to cards with rectangular shapes. The computer system 102 may have tokens 101 with other shapes, such as, but not limited to, square, circular, pentagonal, elliptical, octagonal, and other shapes. The invention is also not limited to the token 101 illustrated in FIG. 2. Other tokens 101 which are not necessarily cards are included within the scope of the invention. The token 101 can comprise any type of object which may be able to support or bear a marker 105A that is tracked by the augmented reality module 160. Further details of the exemplary token 101 illustrated in FIG. 2 are illustrated in FIGS. 9 and 10 and are discussed in further detail below.

The augmented reality module 160 searches for the marker 105A within the image projected on the display 200A in addition to determining the orientation of the marker 105A relative to the camera 175. In other words, the augmented reality module 160 can track the X and Y-axis coordinates of the marker 105A within the image shown on display 200A, as well as the Z-axis coordinate of the marker 105A. According to the exemplary embodiment illustrated in FIG. 2, the Z coordinate can be determined based on the shape of the marker 105A being captured by the camera 175. In the exemplary embodiment illustrated in FIG. 2, the marker 105A appears to have a square shape in the image created by the camera 175 and projected within the display 200A. However, when the token 101 is tilted in space, such as in the Z-axis direction, this action causes the image of the marker 105A to change from a square shape to a rhomboid shape. Similar to the discussion of the token 101 noted above, the marker 105A is not limited to square shapes. Other shapes for the marker 105 include, but are not limited to, circular, cylindrical, triangular, parallelogram, star, pentagonal, octagonal, and other geometrical shapes.

Figure 3:
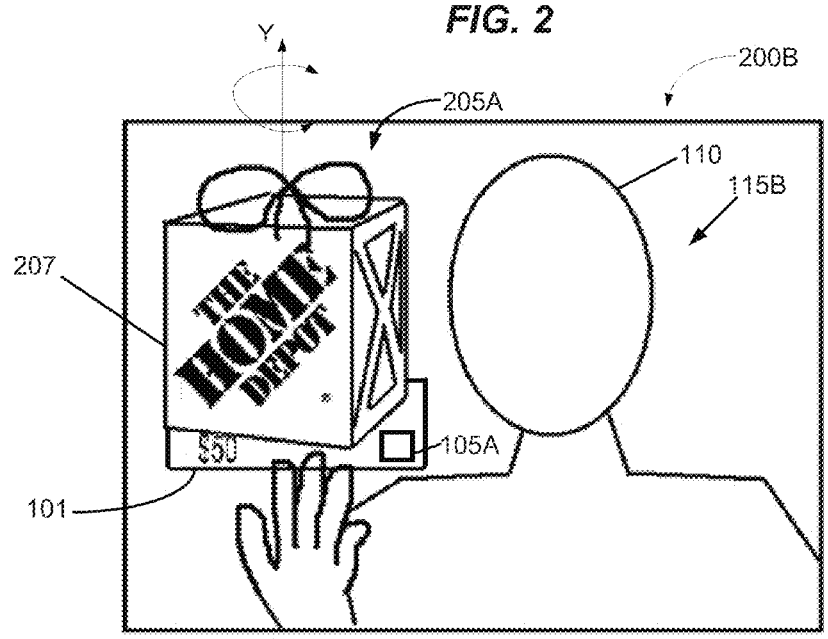
FIG. 3 is an exemplary computer display of a user interface which projects the real world scene comprising the stored value token of FIG. 2 with an augmented reality object added to the scene according to an exemplary embodiment of the invention.

When the condition in which the square shape of the marker 105A is detected by the augmented reality module 160, such as illustrated in FIG. 2, the augmented reality module 160 can project an object 207 into the scene 115B shown on the display 200B as illustrated in FIG. 3.

Referring now to FIG. 3, this Figure is an exemplary computer display 200B of a user interface which projects the real world scene 115B comprising the stored value token 101 of FIG. 2 but with an augmented reality object 207 projected into the scene 115B according to an exemplary embodiment of the invention. The object 207 can comprise a gift crate that has been illustrated with perspective such that the object 207 appears to have three dimensions within the two dimensional display 200B. The object 207 may further comprise human-readable media 209, such as a brand name or source for the stored value token 101.

The object 207 can be made to spin or rotate about an axis such as the Y-axis illustrated in FIG. 3 or the object 207 can remain stationary. The rotation of the object 207 can be made dependent upon a detection of movement of the token 101 generated by the user 110. For example, if the user 110 shakes the token 101 quickly, in a back and forth motion while causing the marker to continue to project a rhomboid shape, then this condition can trigger the augmented reality module 160 to rotate the object 207 about the Y-axis in the image of the display 200B.

The object 207 is not limited to the gift crate illustrated in FIG. 3. Any one of a number of objects 207 can be projected into the scene 115B without departing from the scope of the invention. For example, instead of the gift crate, the object 207 can comprise an object with perspective such as an actual physical gift or a service which could be purchased with the value associated with the token 101. Exemplary gifts could include those from many different types or classes of consumer goods or services, such as, but not limited to, dry goods, household items including hardware, wearing apparel, furniture, furnishings, appliances, and electronics; and services like HVAC services, carpentry services, roofing services, plumbing services, and the like.

Figure 4:
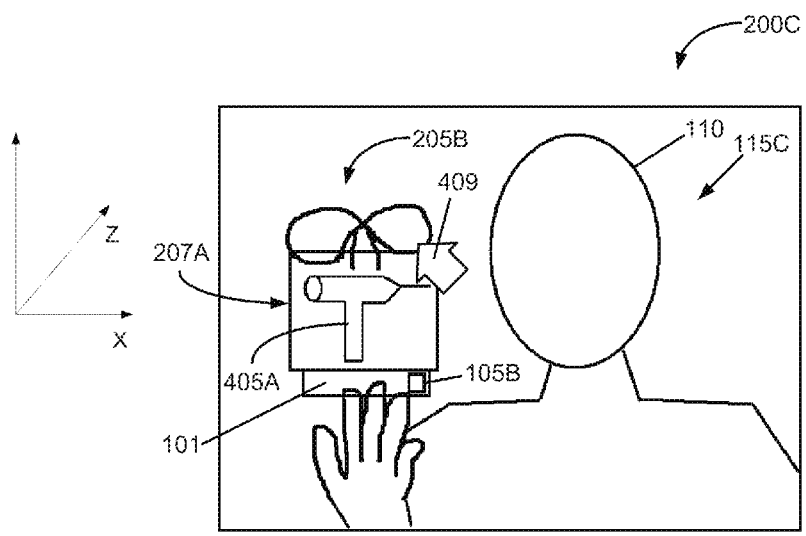
FIG. 4 is an exemplary computer display of a user interface which projects the real world scene comprising the stored value token of FIG. 2 with a modification to the augmented reality object according to an exemplary embodiment of the invention.

FIG. 4 is an exemplary computer display of a user interface 200C which the real world scene 115C comprising the stored value token 101 of FIG. 2 with a modification to the augmented reality object 207 according to an exemplary embodiment of the invention. In FIG. 4, the object 207A has been modified such that it contains a graphical item 405A representing an exemplary consumer good or service which can be purchased based on the specific value associated with or assigned to the stored valued token 101.

In FIG. 4, the exemplary graphical item 405A comprises an image of a consumer good, such as a drill. However, other hardware as well as other classes of consumer goods are within the scope of the invention. Further, in addition to goods, the graphical item 405A may represent any number of services that can be purchased, such as HVAC services, carpentry services, roofing services, plumbing services, and the like. Meanwhile, other classes of consumers goods include, but are not limited to, dry goods, household items—including hardware, wearing apparel, furniture, furnishings, appliances, and electronics. While the exemplary graphical item 405A comprising a consumer good is illustrated with having only two dimensions, it is possible for the invention to support images with perspective, like the three-dimensional gift crate 207, as illustrated in FIG. 3 described above.

In FIG. 4, the augmented reality module 160 detected a change in the status or condition of the marker 105B. Specifically, the augmented reality module 160 detected that the marker was removed from view of the camera 175 and then reintroduced into the view of the camera 175 as a result of a change in location of the stored value token 101. In other words, the augmented reality module 160 has detected that the marker 105B has been removed and then re-introduced into the view of the camera 175. The marker 105B in FIG. 4 has a square shape which indicates that a geometric normal defined by the plane of the square shape is perpendicular to the geometric plane defined by image captured by the camera 175 and projected in the rectangular display 200C. Stated differently, the geometric plane of the square shape defined by the marker 105B is parallel to the geometric plane defined by the rectangular display 200C.

When this condition was detected a second or subsequent time by the augmented reality module 160, the augmented reality module 160 modified the augmented reality object 207 so that it is rendered as a two dimensional object and so that it would contain a graphical item 405A representing a consumer good or service which could be purchased with the value associated with the gift token 101. The system 102 is designed to display only goods and services within a price range associated with the value assigned to a particular stored value token 101 capture in the real world scene 115.

According to one exemplary embodiment, the graphical item 405A comprising a consumer good or service contained within the object 207 can be continuously displayed until the augmented reality module 160 detects one or more conditions. As noted previously, the augmented reality module 160 can follow or track the movement of the marker 105B which is present on the stored value token 101. The augmented reality module 160 can constantly generate the object 207 adjacent to the marker 105B as the marker 105B moves through space by the user 110.

Figure 5:
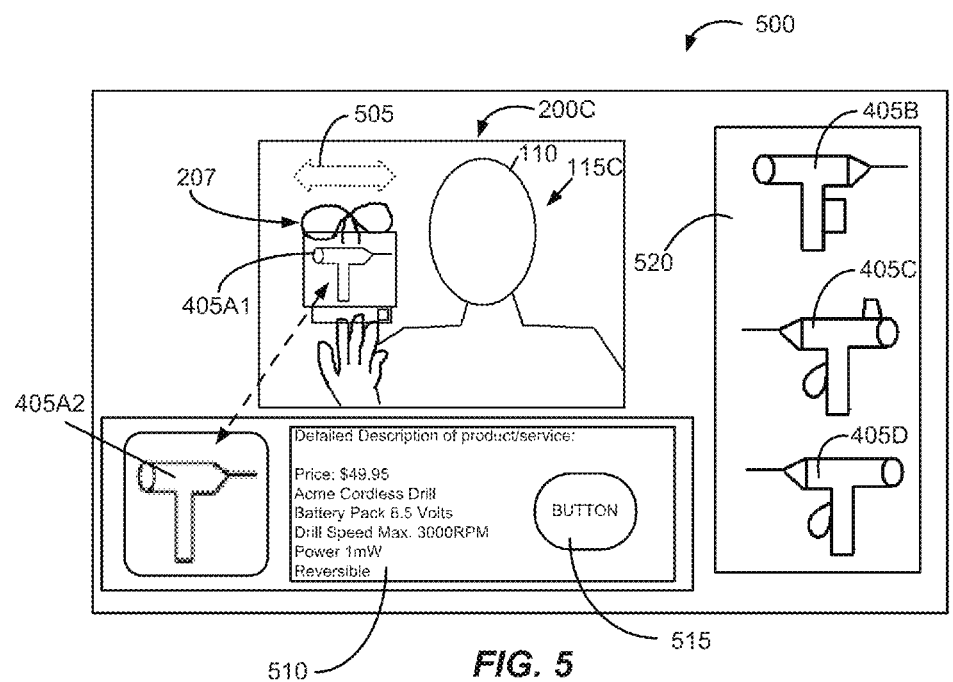
FIG. 5 is an exemplary computer display of the user interface of FIGS. 2-4 in addition to another user interface which provides an on-line shopping database according to an exemplary embodiment of the invention.

FIG. 5 is an exemplary computer display of the user interface 200C of FIGS. 2-4 in addition to another user interface 500 which provides an on-line shopping database according to an exemplary embodiment of the invention. In FIG. 5, the first user interface 200C is positioned within a larger second user interface 500. The second user interface 500 may be designed such that it provides more information about the graphical item 405A1 comprising a consumer good or service contained within the object 207. For example, the second user interface 500 may further comprise a first window 510 that provides human-readable media such as text descriptions, enlarged photos 405A2 of the good or service, costs, and specifications of the exemplary consumer good or service that is represented by the graphical item 405A1 contained within the object 207.

The user interface 500 may further comprise a second window 520 that lists images of other graphical items 405B-D that represent related consumer goods or services, or past viewed goods and services, or both, that may be purchased with the value associated with the token 101. In the exemplary embodiment illustrated in FIG. 5, the other consumer goods or services represented by the graphical items 405B-D can comprise different models or types of the consumer good or service represented by the graphical item 405A1 contained within the object 207. In the exemplary embodiment of FIG.

5, each of the consumer goods or services can comprise different models and/or manufacturers of drills.

The larger second user interface 500 can further comprise a purchase button or a shopping cart button 515. In this way, when the user 110 desires to purchase the consumer good 405A1 contained within the object 207, the user 110 can simply click on the shopping cart button 515. Other buttons as well as other configurations for the windows are within the scope of the invention.

Figure 6:
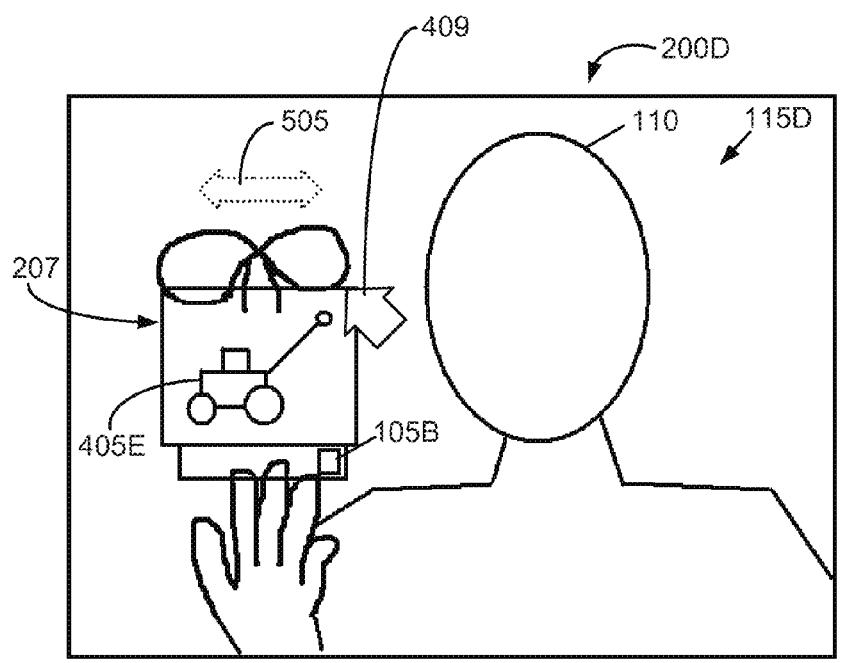
FIG. 6 is an exemplary computer display of a user interface which projects the real world scene comprising stored value token of FIG. 2 but with a further modification to the augmented reality object according to an exemplary embodiment of the invention.

FIG. 6 is an exemplary computer display of a user interface 200D which projects the real world scene 115 comprising the stored value token 101 of FIG. 2 with a different graphical item 405E representing a different consumer good or service relative to the consumer good or service represented by the graphical item 405A illustrated in FIG. 4. In this exemplary embodiment, the graphical item 405E represents a consumer good or service that can comprise a lawnmower or a lawn service. However, other consumer goods or services represented by the graphical item 405E are included with the scope of the invention. As noted above, other consumer goods include, but are not limited to, dry goods, household items including hardware, wearing apparel, furniture, furnishings, appliances, and electronics. Similarly, other services can include, but are not limited to, HVAC services, carpentry services, roofing services, plumbing services, and the like.

A different consumer good or service represented by the graphical item 405E in FIG. 6 can be displayed within the object 207 when one or more conditions are detected by the augmented reality module 160. For example, when the augmented reality module 160 detects lateral movement 505 of the stored value token 101 along the X-axis or Z-axis (See X-axis and Z-axis in FIG. 2), this condition can trigger the augmented reality module 160 to change the consumer good or service represented by the graphical item 405 being displayed within the object 207. The invention is not limited to detecting this type of condition or movement. As noted previously, the augmented reality module 160 may detect when the marker 105B is completely removed from view of the camera 175 and then reintroduced into the view of the cameral 175.

Other conditions that may be detected by the augmented reality module 160 can include, but are not limited to, detecting movement along the Y-axis and Z-axis, detecting input from the user 110 such as detecting movement of the screen pointer 409 or detecting certain keystrokes produced by the user 110. The changing of consumer goods or services represented by graphical items 405E displayed within the object 207 is also not limited to detecting any conditions. The augmented reality module 160 can change the consumer goods or services represented by different graphical items 405E without detecting any conditions that are related to the movement of the marker 105B or based on input from the user 110. For example, the augmented reality module 160 may randomly change the consumer goods or services represented by the graphical items 405 based on the passage of time tracked by a timer.

Figure 7:
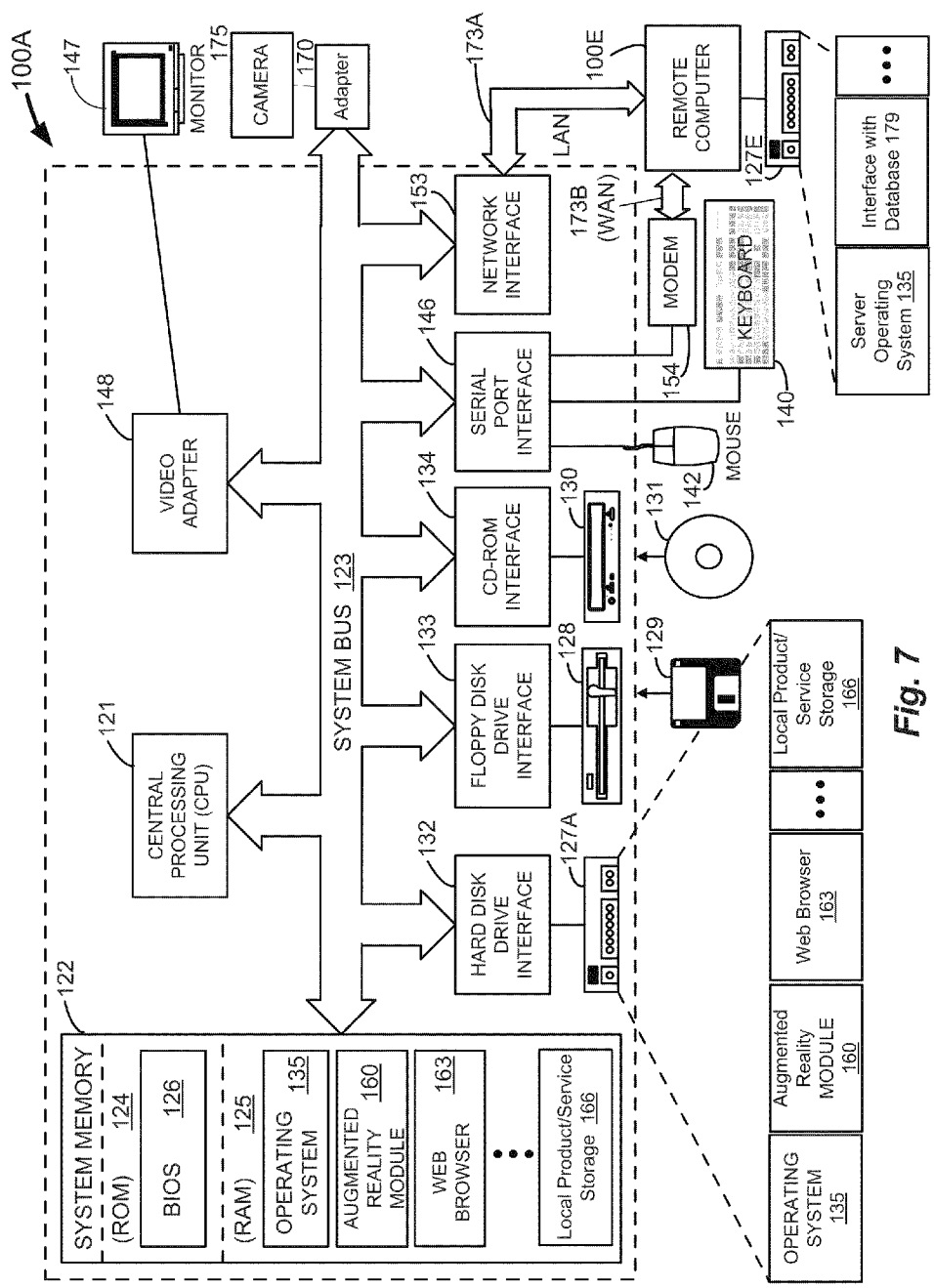
FIG. 7 is a functional block diagram of a computer that can be used in the system for creating an augmented reality experience in connection with a stored value token according to an exemplary embodiment of the invention.

FIG. 7 is a functional block diagram of a client device 100A, for example, a computer, and that can be used in the system 102 for creating an augmented reality experience in connection with a stored value token 101 according to an exemplary embodiment of the invention. The exemplary operating environment for the system 102 includes a general-purpose computing device in the form of a conventional computer. Generally, the client device 100A includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 120, such as during start-up, is stored in ROM 124.

The client device 100A, which may be a computer, can include a hard disk drive 127A for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127A, magnetic disk drive 128, and optical disk drive 130 are connected to system bus 123 by a hard disk drive interface 132, a floppy disk drive interface 133, and an optical disk drive interface 134, respectively.

Although the exemplary environment described herein employs hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in smaller client devices 100A such as in cellular phones and/or personal digital assistants (PDAs). The drives and their associated computer readable media illustrated in FIG. 7 provide nonvolatile storage of computer-executable instructions, data structures, program modules, and other data for computer or client device 100A.

A number of program modules may be stored on hard disk 127, magnetic disk 129, optical disk 131, ROM 124, or RAM 125, including an operating system 135, an augmented reality module 160, a web browser 163, and a local product/service database 166. Program modules include routines, sub-routines, programs, objects, components, data structures, etc., which perform particular tasks or implement particular abstract data types. Aspects of the present invention may be implemented in the form of a downloadable, client-side, browser based augmented reality module 160 which is executed by the client device 100A in order to provide an augmented reality experience in connection with a stored value token 101.

A user 110 may enter commands and information into computer 100A through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

The camera 175 may also be connected to system bus 123 via an interface, such as an adapter 170. As noted previously, the camera 175 can comprise a video camera such as a webcam. The camera 175 can be a CCD (charge-coupled device) camera or a CMOS (complementary metal-oxide-semiconductor) camera. In addition to the monitor 147 and camera 175, the client device 100A, comprising a computer, may include other peripheral output devices (not shown), such as speakers and printers.

The client device 100A, comprising a computer, may operate in a networked environment using logical connections to one or more remote computers, such as the server 100E. A remote computer may be another personal computer, a server, a client, a router, a network PC, a peer device, or other common network node. While the server 100E or a remote computer typically includes many or all of the elements described above relative to the client device 100A, only a memory storage device 127E has been illustrated in the Figure. The logical connections depicted in the Figure include a local area network (LAN) 173A and a wide area network (WAN) 173B. Such networking environments are commonplace in offices, enterprise-wide computer networks, intranets, and the Internet.

When used in a LAN networking environment, the client device 100A, comprising a computer, is often connected to the local area network 173A through a network interface or adapter 153. When used in a WAN networking environment, the client device 100A, comprising a computer, typically includes a modem 154 or other means for establishing communications over WAN 173B, such as the Internet. Modem 154, which may be internal or external, is connected to system bus 123 via serial port interface 146. In a networked environment, program modules depicted relative to the server 100E, or portions thereof, may be stored in the remote memory storage device 127E. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 8A:
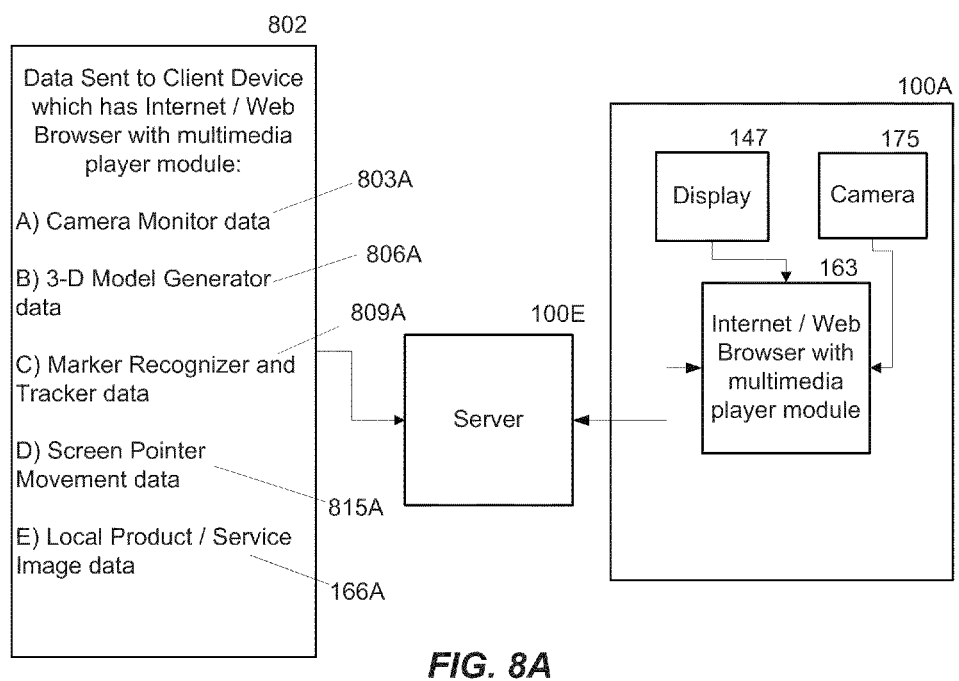
FIG. 8A is a functional block diagram illustrating a group of files which may be assembled by the web server for sending to a client device equipped with an Internet or web browser according to an exemplary embodiment of the invention.

FIG. 8A is a functional block diagram illustrating a data 802 which may be assembled by the server 100E for sending to a client device 100A equipped with an Internet or web browser 163 according to an exemplary embodiment of the invention. The data 802 may include camera monitor data 803A, 3-D model generator data 806A, marker recognizer and tracker data 809A, screen pointer movement data 815A, a local product/service data 166A, which forms the local product/service storage 166 of FIG. 7. Except for the local product image data 166A, the remaining data comprise information that is used to modify and/or supplement existing libraries found in the multimedia player module that is present within the web browser 163. For example, the data 802 can modify and/or supplement the libraries of the software product currently distributed under the name of Adobe brand flash player.

The group 802 of files can be downloaded from the server 100E when the web browser 163 sends a request to initiate the augmented reality experience. Usually, this request from the web browser 163 for initiating the augmented reality experience will include a token identifier from the stored value token 101 so that the server 100E will locate and assemble the correct local product/service file 166A associated with the stored value token 101. Further details of the group 802 of files will be discussed in further detail below in connection with FIG. 8B.

Figure 8B:
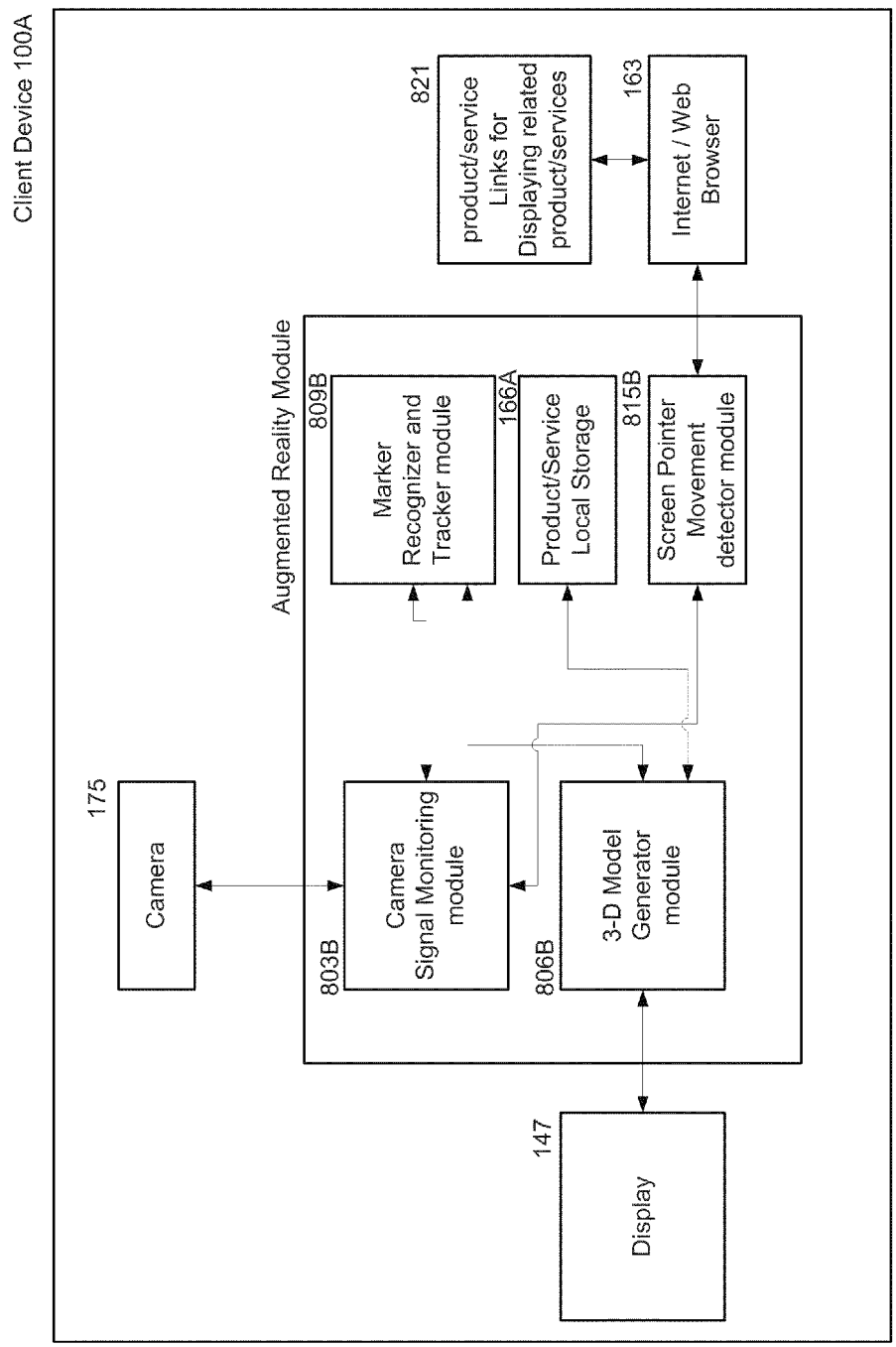
FIG. 8B is a functional block diagram illustrating a software architecture for a client device executing an augmented reality module according to an exemplary embodiment of the invention.

FIG. 8B is a functional block diagram illustrating a software architecture for a client device 100A executing an augmented reality module 160 according to an exemplary embodiment of the invention. This software architecture is formed from the group 802 of files illustrated in FIG. 8A. The augmented reality module 160 may comprise a camera signal monitoring module 803B, a 3-D model module 806B, a marker recognizer and tracker module 809B, a product/service local storage 166A, and the screen pointer movement detector module 815B.

The camera signal monitoring module 803B is responsible for determining if the client device 100A has a camera 175. Once the camera signal monitoring module 803B determines that a camera 175 is present, the camera signal monitoring module 803B can track the video signals being generated by the camera 175. The camera signal monitoring module 803B can include a current off-the-shelf library present in software distributed under the name Adobe brand flash player. The name of the library, as of this writing, is the flash.media.video. The camera signal monitoring module 803B can communicate with the marker recognizer and tracker module 809B and the screen pointer movement detector module 815B.

The marker recognizer and tracker module 809B is designed to identify the marker 105 and to track the marker 105 as it is moved throughout the view of the camera 175. Like the camera signal monitoring module 803B, the marker recognizer and tracker module 809B can include current off-the-shelf libraries present in software distributed under the Adobe brand flash player. The name of the two libraries forming the marker recognizer and tracker module 809B, as of this writing, are the following: libspark.flartoolkit and flash.media.video. The marker recognizer and tracker module 809B can communicate with the camera signal monitoring module 803B and the 3-D model generator module 806B.

The 3-D model generator module 806B can generate the object 207 having perspective as illustrated in FIG. 3 discussed above. The 3-D model generator module 806B can position the object 207 adjacent to the marker 105 by using data provided by the marker recognizer and tracker module 809B. The 3-D model generator module 806B can also produce the object 207 without any perspective and enclosing or circumscribing the graphical item 405 (as illustrated in FIG. 4) that may represent a product and/or a service. The 3-D model generator module 806B can include current off-the-shelf libraries present in software distributed under the name Adobe brand flash player. The name of the four libraries forming the 3-D model generator module 806B, as of this writing, are flash.media.video; libspark.flartoolkit; ascollada; and papervision3d. The 3-D model generator module 806B can communicate with the marker recognizer and tracker module 809B and the product/service local storage 166A.

The screen pointer movement detector module 815B can determine if the user 110 has moved a screen pointer 409 over the object 207 containing the graphical item 405 and/or if the graphical item 405 is selected. In response to detecting these conditions, the screen pointer movement detector module 815B may direct the web browser 163 to retrieve additional information about the graphical item 405 from the server 100E. The screen pointer movement detector module 815B can include current off-the-shelf libraries present in software distributed under the Adobe brand flash player. The name of the library forming screen pointer movement detector module 815B, as of this writing, is the following: flash.net. A screen pointer movement detector module 815B can communicate with the camera signal monitoring module 803B and the web browser 163.

The product/service local storage 166A may comprise a file that contains graphical items 405. These graphical items 405 may represent one or more products and/or services that were retrieved by the server 100E as matching a value which is equal to or less than the value of the stored value token 101. The web browser 163 may provide links 821 for displaying products/services 405B-D that may be related to the graphical item 405 that can be contained within the object 207, as illustrated in FIG. 5.

FIG. 9 is a first side view of an exemplary stored value token 101A according to an exemplary embodiment of the invention. The stored value token 101A may comprise a rectangular shape and can have a length L and a width W that generally correspond with the length and width of cards used in financial transactions. In other words, the length L and width W can be selected to correspond with standard sized financial cards like debit cards, integrated circuit (IC) cards, and credit cards as used in industry. The length L and width W can correspond with Format ID-1 of the International Organization for Standardization (ISO) and the International Electrotechnical Commission (ISO/IEC) standard 7810. This means that the length L can comprise a magnitude of about eighty-five millimeters and the width W can comprise a magnitude of about fifty-four millimeters. Dimensions greater than or less than these exemplary magnitudes are within the scope of the invention.

As noted above, the inventive system 102 is not limited to tokens 101 comprising cards with rectangular shapes. The inventive system may have tokens 101 with other shapes, such as, but not limited to, square, circular, pentagonal, elliptical, octagonal, and other shapes. The invention is also not limited to the token 101 illustrated in FIGS. 9-10. Other tokens 101 which are not cards are included within the scope of the invention. The token 101 can comprise any type of object which may be able to support or bear a marker 105B1 that is tracked by the augmented reality module 160.

The exemplary card token 101A illustrated in FIG. 9 can be made from one or more various materials. For example, the card token 101A may be made from materials such as, but not limited to, paper, cardboard, plastic, metal, and other similar materials.

On a first side 901A, the card token 101A may comprise human-readable media 903 and machine-readable media 1010A. The human-readable media 903 may comprise a value 903A assigned to the card token 101A. In the exemplary embodiment of FIG. 9, the value 903A comprises fifty U.S. dollars. However, other magnitudes for the value 903A as well as other currencies may be used without departing from the scope of the invention. The human-readable media 903 may further comprise text 903B which can identify that the token 101A is a form of a financial instrument, such as a gift card. The text 903B can take on any form and can provide any type of information desired by the manufacturer or originator of the token 101A.

The marker 105B1 can comprise an outer square box 906A that encloses or circumscribes an inner member 909A. The inner member 909A in the exemplary embodiment illustrated in FIG. 9 comprises dark text positioned on a white background. Specifically, the dark text may identify the source or originator of the token 101A. In the exemplary embodiment illustrated in FIG. 9, the dark text comprises the phrase, "The Home Depot." However, the inner member 909A is not limited to text and can comprise other elements in addition to or instead of the text. The other elements for the inner member 909A can include, but are not limited to, graphical characters, shapes, symbols, and other similar elements.

The inventors have discovered that a marker 105 which comprises a dark outer member 906A that encloses or circumscribes an inner dark member 909 that is positioned on a white surface is more readily detectable by the camera 175 compared to other markers 105 which have been tested by the inventors. The outer member 906 is not limited to a square box. Other shapes are possible and are within the scope of the invention. For example, other shapes include, but are not limited to, rectangular, circular, pentagonal, elliptical, octagonal, and other shapes. As noted previously, it is helpful to select a geometry for the shape of the marker 105 such that it is easy to detect the orientation of the marker 105 relative to the Z-axis, if that is a condition which will be monitored by the augmented reality module 160. Further details of various different markers 105 that can be employed are illustrated in FIGS. 11A through 11F and are discussed in further detail below.

The token 101A may further comprise machine-readable media 1010A which has been illustrated with dashed lines to denote that it is hidden from the view illustrated in FIG. 9. Further details of the machine-readable media 1010A are illustrated in FIG. 10 and discussed in further detail below.

Figure 10A:
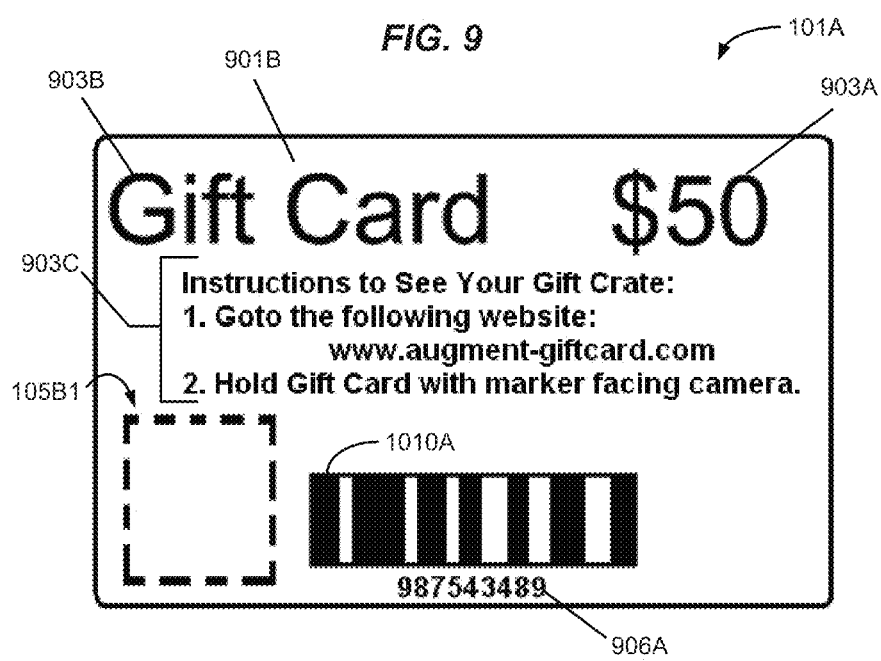
FIG. 10A is a second side view of the exemplary stored value token of FIG. 9 according to an exemplary embodiment of the invention.

FIG. 10A is a second side view of the exemplary stored value token 101A of FIG. 9 according to an exemplary embodiment of the invention. On this second side 901B of the stored value token 101A, both human-readable media 903 and machine-readable media 1010A can be present. However, it is within the scope of the invention for this second side 901B to display only machine-readable media 1010A. The human-readable media 903 on the second side 901B can comprise instructions 903C which can explain how to use the token 101A and how to access the augmented reality module 160.

Figure 12:
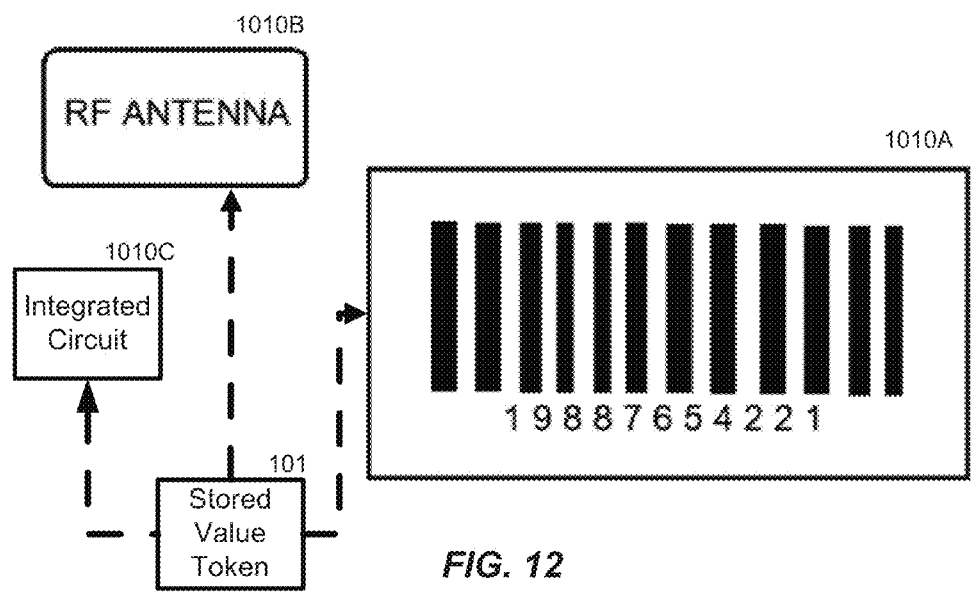
FIG. 12 illustrates various exemplary embodiments of the machine-readable code for the stored value token according to the invention.
Figure 13:
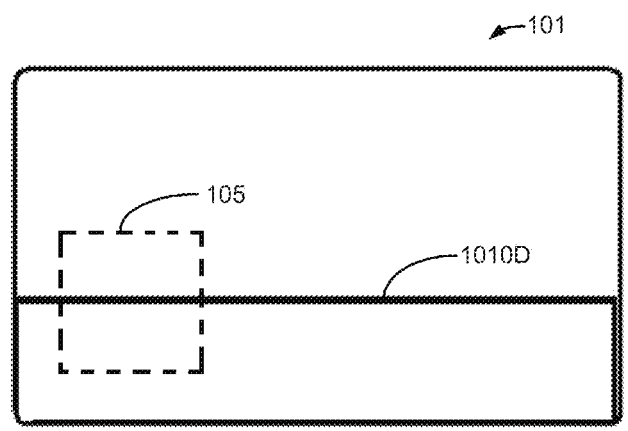
FIG. 13 illustrates a magnetic stripe for the machine-readable code according to an exemplary embodiment of the invention.

In the exemplary embodiment illustrated in FIG. 10A, the machine-readable media 1010A comprises a bar code. The token 101A is not limited to the machine-readable media 1010A illustrated in FIG. 10. The machine-readable media 1010A can comprise one or more different forms. For example, the machine-readable code 1010A can comprise a magnetic stripe, an integrated circuit chip, a radio-frequency antenna, and other similar machine-readable elements. Other machine-readable elements are illustrated in FIGS. 12-13 and are described in further detail below. The machine-readable media 1010A can communicate a code and/or the actual value of the token 101A to a reader so that the value associated with the token 101A can be ascertained by a computer, such as a point-of-sale (POS) terminal. A human-readable code 903D that corresponds with the machine-readable code 1010A may also be present beneath the machine-readable code 1010A.

The marker 105B1 has been illustrated with dashed lines on the second side 901B to denote that it is hidden from the view illustrated in FIG. 10A. Further details of the marker 105 are illustrated in FIG. 11 and discussed in further detail below.

The marker 105, the human-readable media 903, and machine-readable media 1010A may be formed from ink or other marking media. These elements can be directly applied to their respective sides 901 of the token 101A or they may be applied to a substrate that is attached to respective sides 901 of the token 101A with an adhesive.

Figure 10B:
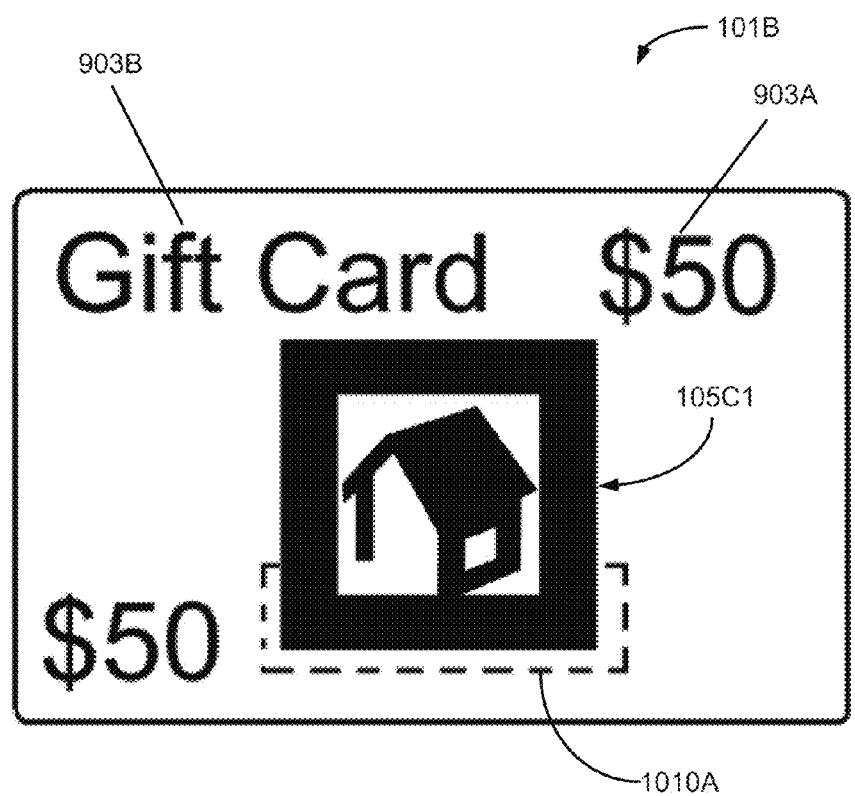
FIG. 10B is a second side view of the exemplary stored value token according to an exemplary embodiment of the invention.

FIG. 10B is a first side view of an exemplary stored value token 101B according to an exemplary embodiment of the invention. In this exemplary embodiment, the marker 105C1 is centered according to a geometric center of the token 101B. The marker 105C is also made larger or bigger relative to the markers illustrated in FIGS. 9, 10A, and 11A-11F.

Figure 11A:
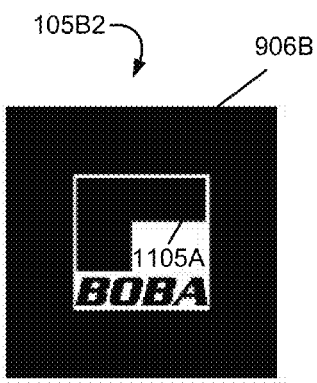
FIGS. 11A-11F are exemplary markers that can be used on stored value tokens according to an exemplary embodiment of the invention.

FIGS. 11A-11F are exemplary markers 105 that can be used on stored value tokens 101A according to an exemplary embodiment of the invention. FIG. 11A illustrates an example of a marker 105B2 that comprises a square shaped outer member 906B which encloses a graphical element 1105A and human-readable media 909B. The graphical element 1105A can comprise a rotated "L"-shaped member. The human-readable media 909B can comprise text, such as the phrase "BOBA." However, other text can be used without departing from the scope of the invention.

It is noted that human-readable media, such as the human-readable media 909B of FIG. 11A may also be recognized by a machine if the media comprises text and if the machine reading the text is equipped with an optical character recognition system. While the outer member 906B and the inner members 909, 1105 of the various Figures have been illustrated with solid black colored ink, the inventive system may also employ the use of color if such color can assist with detection of the marker 105. Further, the position of the inner members 909, 1105 relative to the outer member 906B can be varied without departing from the scope of the invention.

Figure 11B:
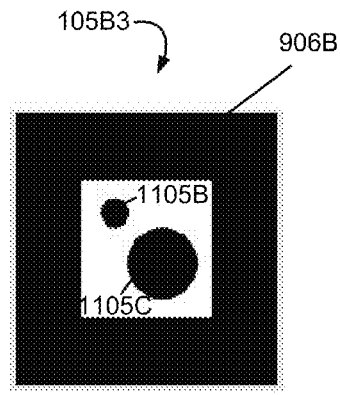

FIG. 11B illustrates an example of a marker 105B3 that comprises a square shaped outer member 906B which encloses a first and second graphical elements 1105B and 1105C. The first and second graphical elements 1105B and 1105C can comprise two circular shaped solid colored elements that are positioned within a whitespace or unfilled region contained within the outer member 906B. In this exemplary embodiment, the first graphical element 1105B may have a size which is smaller relative to the second graphical element 1105C.

Figure 11C:
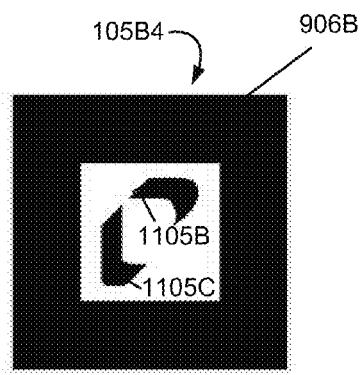

FIG. 11C illustrates an example of a marker 105B4 that comprises a square shaped outer member 906B which encloses two graphical elements 1105D1 and 1105D2. In the exemplary embodiment illustrated in FIG. 11C, the two graphical elements may be opposite shapes relative to each other. That is, the first graphical element 1105D1 may comprise a backwards "L"-shape while the second graphical element 1105D2 may comprise an "L"-shape.

Figure 11D:
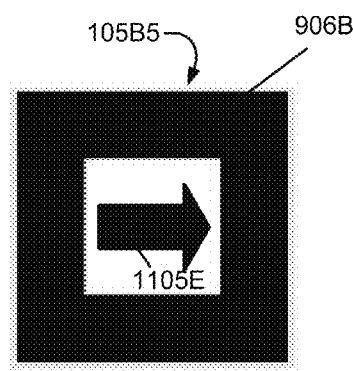

FIG. 11D illustrates an example of a marker 105B5 that comprises a square shaped outer member 906B which encloses a single graphical element 1105E. The single graphical element 1105E may comprise a traditional geometry, such as an "arrow"-shape. As noted above, the outer member 906B and the inner member 1105 may have colors other than the dark black color provided in the Figures. For example, the single graphical element 1105E may comprise a certain color such as the color red.

Figure 11E:
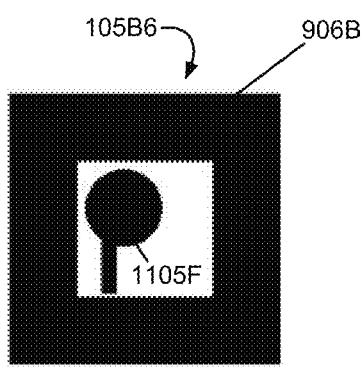

FIG. 11E illustrates an example of a marker 105B6 that comprises a square shaped outer member 906B which encloses another single graphical element 1105F. The single graphical element 1105F may comprise a "P"-shaped solid element.

Figure 11F:
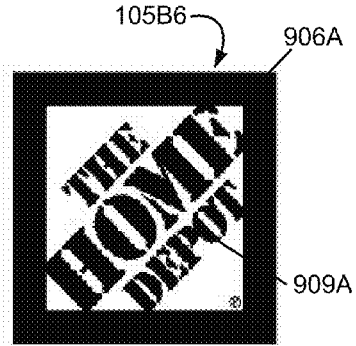

FIG. 11F illustrates an example of a marker 105B1 that comprises a square shaped outer member 906B which encloses human-readable media 909A. The human-readable media 909A can comprise text. As the previously, the human-readable media 909 may also be read by a machine if such a machine is equipped with an optical character recognition system. For the exemplary embodiment illustrated in FIG. 11E, the augmented reality module 160 may search for a certain shape of the human-readable media 909A without actually performing optical character recognition of the text. However, optical character recognition of the text can be within the scope of the invention. The exemplary text of FIG. 11F can also denote a source or an originator of the token 101A. The exemplary text in FIG. 11F comprises the phrase, "The Home Depot."

FIG. 12 illustrates various exemplary embodiments of the machine-readable code 1010 for the stored value token 101 according to the invention. The machine-readable code 1010 can take on one or more different types of forms. For example, the machine-readable code 1010A can comprise a bar-code. The machine-readable code 1010B can comprise an RF antenna coupled to an integrated circuit or the RF antenna can be tuned to a particular unique frequency. Alternatively, the machine-readable code 1010C can comprise an integrated circuit (IC) such as an IC circuit for an IC card. The machine-readable code 1010 can take the form of any one or any combination of these exemplary codes 1010 illustrated in FIG. 12.

FIG. 13 illustrates a magnetic stripe for the machine-readable code 1010D according to an exemplary embodiment of the invention. The magnetic stripe machine-readable code 1010D can be positioned on the second side 901B (as illustrated) of the token 101, or on the first side 901A (not illustrated). In this view, the marker 105 is illustrated with dashed lines to signify that it is hidden with respect to this view.

Figure 14A:
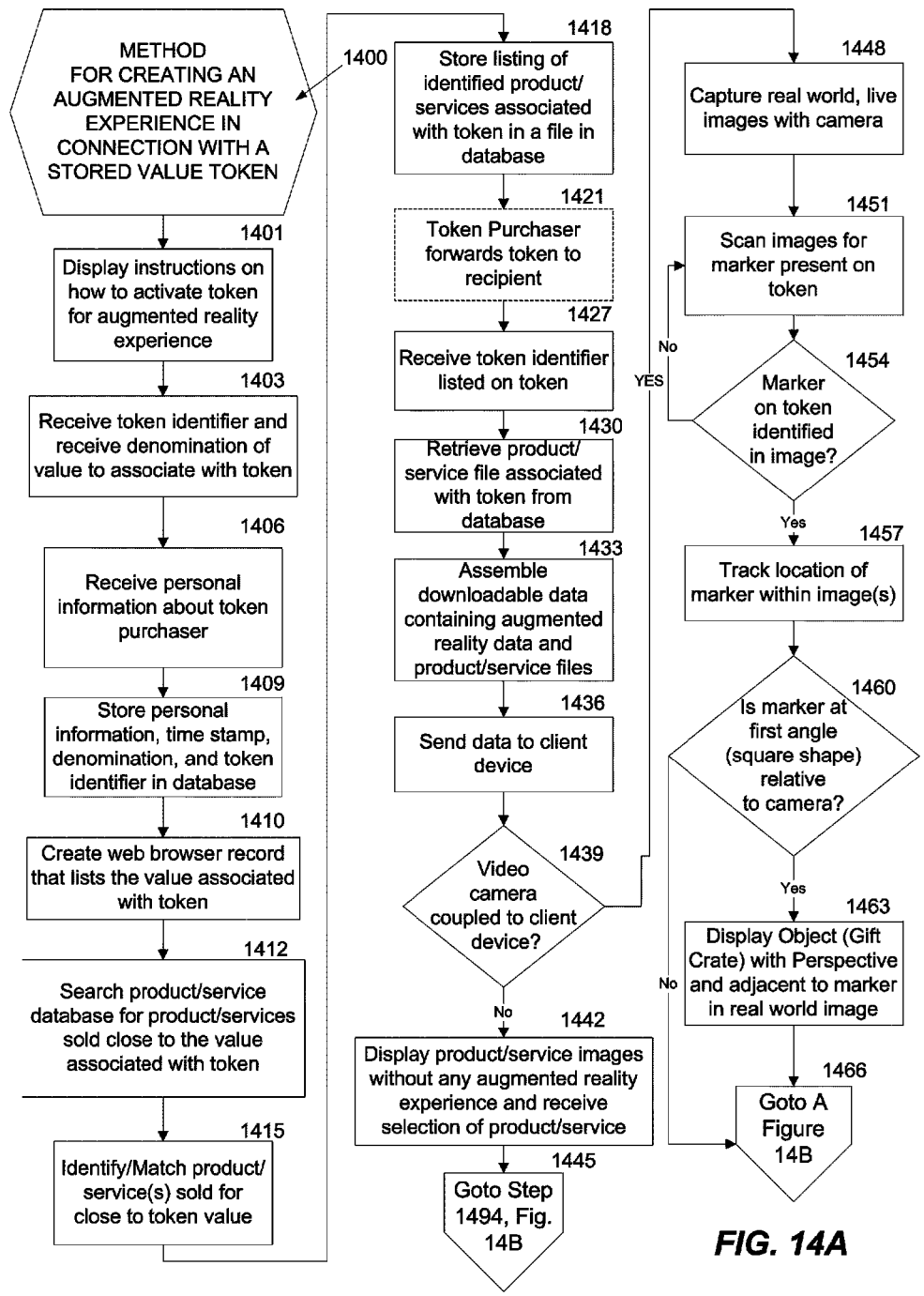
FIGS. 14A and 14B are logic flow diagrams highlighting various steps of a method for creating an augmented reality experience in connection with a stored value token according to an exemplary embodiment of the invention.

FIG. 14A is a logic flow diagram highlighting various steps of a method 1400 for creating an augmented reality experience in connection with a stored value token 101 according to an exemplary embodiment of the invention. One of ordinary skill in the art will appreciate that the functions described herein as they relate to either the augmented reality module 160 or the server 100E (or both) can comprise firmware code executing on a microcontroller, microprocessor, a DSP, or state machines implemented in application specific integrated circuits (ASICs), programmable logic, or other numerous forms without departing from the spirit and scope of the invention.

Figure 14B:
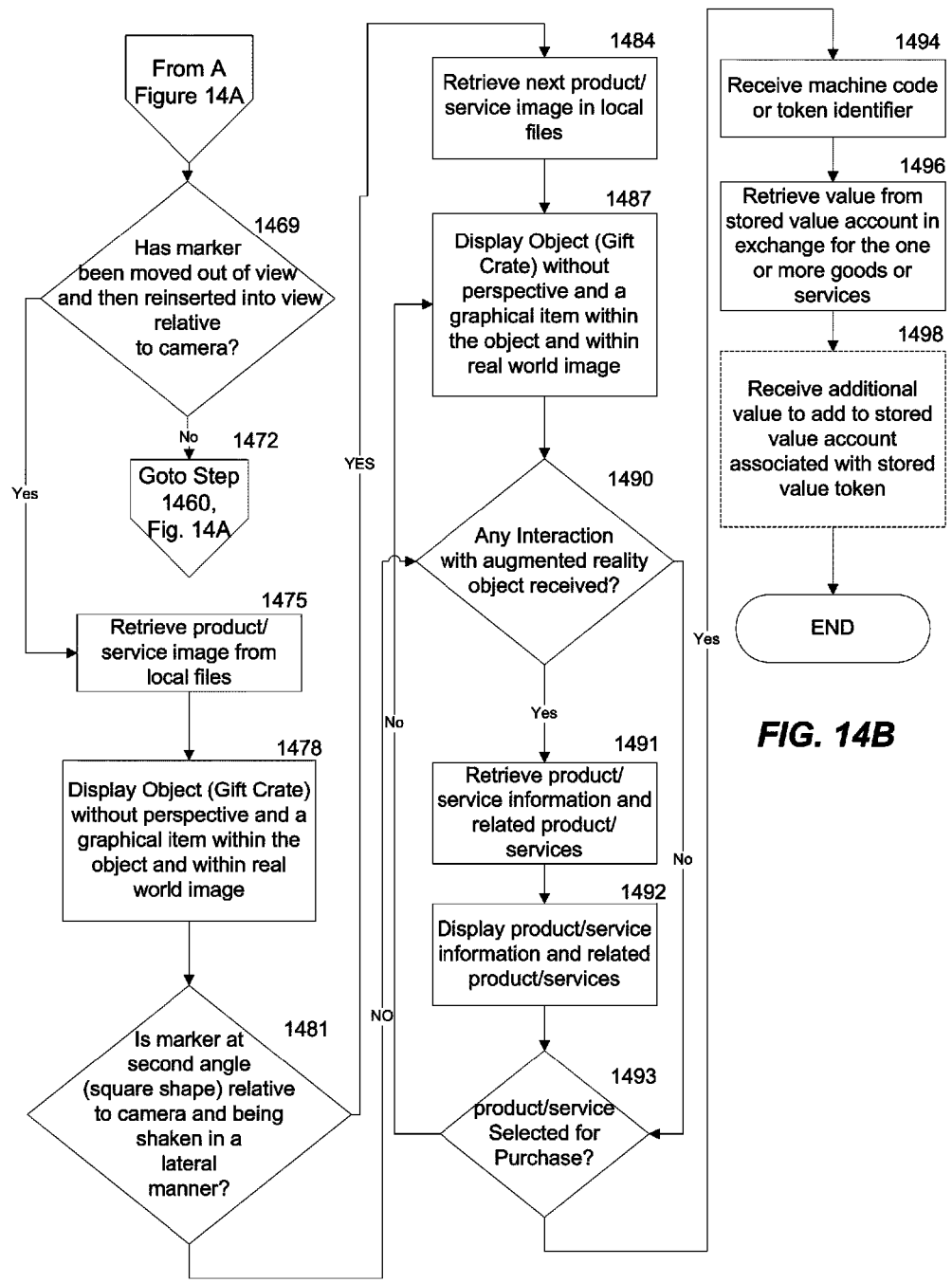

In other words, these steps illustrated in FIGS. 14A, 14B, and any other logic flow diagrams of this disclosure may be provided as a computer program which may include a machine-readable medium having stored there on instructions which may be used to program a computer (or other electronic devices) to perform a process according to the invention. The machine-readable medium may include, but is not limited to, a floppy diskette, optical disk, CD-ROM, magneto-optical disks, ROMs, RAMs, EEPROMs, EEPROMs, magneto-optical cards, flash memory, or other type of medias/machine-readable mediums suitable for storing electronic instructions.

Further, certain steps in the processes or process flow described in this specification must naturally precede others for the invention to function as described. However, the invention is not limited to the order of the steps described if such order or sequence does not alter the functionality of the invention. That is, it is recognized that some steps may performed before, after, or parallel other steps without departing from the scope and spirit of the invention. In some instances, certain steps can be deleted or not performed without departing from the invention.

Additionally, one of ordinary skill and programming would be able to write computer code or identify appropriate hardware or circuits to implement the disclosed invention without difficulty based on the flow charts and associated description in the application text, for example.

Therefore, disclosure of a particular set of program code instructions or detailed hardware devices is not considered necessary for an adequate understanding of how to make and use the invention. The inventive functionality of the claimed computer implemented processes will be explained in more detail in the following description and in conjunction with the Figures which may illustrate various process flows.

Referring now to FIG. 14A, step 1401 is the first step of the method 1400 and which instructions may be displayed on the display device 147 on how to activate the stored value token 101 for the augmented reality experience. As noted previously, the human-readable media 903C on a second side 901B of the stored value token 101 can comprise instructions on how to access an Internet website supported by the server 100E. The Internet website can provide these instructions.

In step 1403, the server 100E can receive a token identifier from the client device 100A in addition to a denomination of value to associate or assigned to the token 101. The token identifier may comprise the human-readable code 903D that is positioned adjacent to the machine-readable code 1010A as illustrated in FIG. 10. The server 100E may allow the purchaser of the stored value token 101 to select various denominations of value at predetermined levels that can be deposited in a stored value account which is associated with the stored value token 101. For example, if US currency is used, a purchaser of the stored value token can select from a group of predetermined increments of value to associate with the stored value token 101 such as on the order of $25, $35, $50, and $100. However, other increments of value and other currencies, such as Euros, are within the scope of the invention.

In step 1406, the purchaser of the stored value token 101 can be prompted by the server 100E to input personal information. For example, such personal information can include, but is not limited to, name, street address, zip code, phone number, etc. It is noted that step 1406 is optional.

Next, in step 1409, the personal information entered in step 1406, a time stamp, a denomination of the stored value token 101 selected in step 1403, and the token identifier are stored in the products/services database 179. In step 1410, the server 100E can create a record that lists the value associated with the stored value token 101. In this step, the server 100E may create a new user session cookie for the web browser 163 running on the client device 100A.

In step 1412, the web server 100E can search the product/services database 179 for one or more products/services that may have a value which is close to the selected denomination/value associated with the stored value token 101. This means that the web server 100E can search the database 179 for one or more products/services that are greater than, less than, or equal to the selected denomination/value associated with the stored value token 101. In step 1415, products/services matching the value condition for the search are identified by the server 100E.

Next, in step 1418, a listing of the identified products/services that match the value condition are associated with the token identifier and stored in the database 179. In this step 1418, graphical items that can comprise images, such as photographs, of products and items or icons that represent services associated with the matched products/services can be collected and stored in a record. This data collected in this step 1418 can be appended to the record created in step 1409.

In optional step 1421 illustrated with dashed lines, the purchaser of the stored value token 101 can forward the token 101 to an intended recipient. This step is optional because the purchaser of the stored value token 101 may decide to initiate the augmented reality experience prior to giving the stored value token 101 to another person.

In step 1427, the server 100E may receive the token identifier listed on the stored value token 101 from the client device 100A. There may be different websites set up for activating the stored value token 101 and using the stored value token 101 after it has been activated. The website providing the augmented reality data for the client device 100A after the token 101 has been activated may prompt the user to enter the token identifier as the first step in initiating the augmented reality experience. So step 1427 may constitute the request to initiate the augmented reality experience by prompting a user to key-in a token identifier. In step 1430, the server 100E may retrieve the product/service file associated with the token identifier from the product/service database 179.

Next, in step 1433, the server 100E can assemble data 802 that contains the information for the augmented reality module 160. The data 802 may also include the product/service file(s) that are associated with the token identifier of the stored value token 101. The data 802 may further include data for the camera monitor file 803A, data for the 3-D model generator file 806A, data for the marker recognizer and tracker file 809A, and data for the screen pointer movement file 815A. These files are discussed above and are illustrated in FIG. 8A.

In step 1436, the server 100E sends the data 802 over the computer network 173 to the client device 100A. The client device 100A initializes the data 802 with a multimedia player module that is part of an Internet/web browser 163. After the initialization of the data 802 with the multimedia player module such that the augmented reality module 160 is activated, in decision step 1439, the augmented reality module 160 can determine if a video camera 175 is coupled to the client device 100A.

Specifically, in this decision step 1439, the camera signal monitoring module 803A of the augmented reality module 160 will check to determine if a video camera 175 is coupled to the client device 100A. If the inquiry to decision step 1439 is positive, then the "Yes" branch is followed to step 1448. If the inquiry to decision step 1439 is negative, then the "No" branch is followed to step 1442.

In step 1442 product/service images can be shown on the display device 147 without any augmented reality experience. The server 100E can also receive any selections of the products/services that may be displayed with the web browser 163. In step 1445 the process continues to step 1494 of FIG. 14B.

In step 1448, real world, live images can be captured with the camera 175 and may be shown on the display device 147. In step 1451, the augmented reality module 160 can scan the images produced by the camera 175 for the marker 105 which is present on the stored value token 101. Specifically, in this step 1451, the marker recognizer and tracker module 809B monitors the output of the camera signal monitoring module 803B for the marker 105.

In decision step 1454, the augmented reality module 160 determines if the marker 105 on the stored value token 101 has been detected. If the inquiry to decision step 1454 is negative, then the "No" branch is followed back to step 1451. If the inquiry to decision step 1454 is positive, then the "Yes" branch is followed to step 1457.

In step 1457, the augmented reality module 160 continuously tracks the location of the marker 105 within the images produced by the camera 175. In this step, the marker recognizer and tracker module 809B constantly identifies the location of the marker 105 within the images relative to the camera 175.

In decision step 1460, the augmented reality module 160, and specifically the marker recognizer and tracker module 809B, determines if the marker 105 is at a first angle relative to the camera 175. In this decision step 1460, the marker recognizer and tracker module 809B determines if the marker 105 has a square shape as illustrated in FIG. 3 and discussed above. As noted previously, when the marker 105 has a square shape this means that a geometric plane defined by the marker 105 is at an angle which is substantially equal to ninety degrees relative to a normal of a geometric plane defined by the X-axis and Y-axis of the display 200. Other methods or algorithms for determining the relative orientation of the marker 105, other than searching for specific shapes of the marker 105 which depend on the marker's orientation, are within the scope of the invention.

If the inquiry to decision step 1460 is negative, then the "No" branch is followed to step 1466 in which the process continues to decision step 1469 of FIG. 14B. If the inquiry to decision step 1460 is positive, then the "Yes" branch is followed to step 1463 in which the augmented reality module 160 renders an object 207 with perspective and adjacent to the marker 105A in the real world scene 115 as illustrated in FIG. 3. Specifically, in this step, the 3-D model generator module 806B generates the object 207 which comprises a gift crate that may rotate about the Y-axis as illustrated in FIG. 3. The object 207 with perspective provides the user 110 with the augmented reality experience in which the user 110 perceives the object 207 to have three dimensions as shown on the two-dimensional display 200.

From step 1466, the process continues to decision step 1469 of FIG. 14B. In decision step 1469, the augmented reality module 160 determines if the marker 105 on the stored value token 101 in the images captured by the camera 175 has been removed from the view of the camera 175 and then re-introduced into the view of the camera 175. Specifically, in this step, the marker recognizer and tracker module 809B of the augmented reality module 160 determines if the marker 105 having a square shape has been removed from the camera's view and then reintroduced into this view. Removal from the camera's view can include situations in which the token 101 is shaken quickly so that the augmented reality module 160 cannot track the marker 105 because of the vigorous movement of the token 101 through space.

As an alternative exemplary embodiment, the augmented reality module 160 in step 1469 can determine if the marker 105 on the stored value token 101 in the images captured by the camera 175 is at a predetermined angle relative to the camera 175. In other words, in this step 1469, the marker recognizer and tracker module 809B of the augmented reality module 160 can determine if the marker 105 has a rhomboid shape. In other words, the marker recognizer and tracker module 809B determines if the geometric plane defined by the marker 105 is at an angle other than ninety-degrees relative to a normal of a geometric plane defined by the X-axis and Y-axis of the display 200. At such an angle, the marker 105 will likely have a rhomboid shape or non-square shape. A rhomboid shape of the marker 105 can indicate that the marker 105 is at angle other than ninety-degrees relative to the geometric normal defined by the display 200 or view of the camera 175. This means that the augmented reality module 160 can invoke certain functions based on conditions (positions) of the marker 105 relative to the camera 175. The invention is not limited to triggering functions based on the angle of the marker 105 relative to the camera. Other conditions of the marker 105, besides angles, can be used to trigger functions or output for the augmented reality display.

If the inquiry to decision step 1469 is negative, then the "No" branch is followed to step 1472 in which the process returns to step 1460 of FIG. 14A. If the inquiry to decision step 1469 is positive, then the "Yes" branch is followed to step 1475 in which a graphical item 405 is retrieved from the product/service local storage 166A. This graphical item can comprise an image, such as a photograph of a product or a photograph or an icon that represents a service.

In step 1478, the object 207 may be displayed without any perspective or depth, such as a object 207 having only two dimensions, and such that the object 207 contains or circumscribes the graphical item 405 as illustrated in FIG. 4. In other words, the object 207 is changed such that it is not illustrated with perspective to show three dimensions in the two-dimensional display 200. As an alternative to the object 207 containing or circumscribing the graphical item 405, the object 207 may be completely removed and substituted with a graphical item 405 that may also have perspective (three-dimensions) similar to the object 207. All of this functionality can be performed by the 3-D model generator module 806B of FIG. 8B.

Next, in decision step 1481, it is determined if the marker 105 is at the second angle relative to the camera 175 (similar to the calculation in step 1469) and whether the marker 105 was shaken in a lateral manner. Specifically, the marker recognizer and tracker module 809B can determine whether the marker 105 was oscillated along the X-axis as illustrated in FIG. 6. If the inquiry to decision step 1481 is negative, then the new branch is followed to decision step 1490.

If the inquiry to decision step 1481 is positive, then the "Yes" branch is followed to step 1484 in which the augmented reality module 160, and specifically the 3-D model generator module 806B, retrieves the next graphical item 405 within the product/service local storage 166A that has a price which is equal to or less than the value of the stored value token 101.

In step 1487, the object 207 is again displayed without any perspective similar to step 1478. The object 207 is generated such that it is only displayed as a two-dimensional object and such that it contains or circumscribes the next graphical item 405, like FIG. 6, that represents at least one of a product and service which has a price equal to or less than the value of the stored value token 101. The 3-D model generator module 806B is responsible for rendering the object 207 and graphical item 405. As noted previously, as an alternative to displaying the object 207 containing the graphical item 405, the graphical item 405 could be displayed with perspective or with three dimensions while the object 207 is completely removed from the display 200.

Next, in decision step 1490, interaction with the augmented reality object 207 can be detected by the screen pointer movement detector module 815B of FIG. 8B. In this step, the screen pointer movement detector module 815B can determine if the user 110 has interacted with the object 207 with a screen pointer 409. In addition to monitoring screen input, the detector module 815B may also monitor other input, such as, but not limited to, keystrokes from a keyboard.

If the inquiry to decision step 1490 is negative, then the "No" branch is followed to decision step 1493. If the inquiry to decision step 1490 is positive, then the "Yes" branch is followed to step 1491 in which product/service information of related products or services 405B-D relative to the graphical item 405A1 currently displayed are retrieved with the web browser 163 and are displayed within regions or windows adjacent to the augmented reality display 200C as illustrated in FIG. 5. In step 1492, the related products or services 405B-D can be displayed as illustrated in FIG. 5.

In decision step 1493, the web server 100E can determine if any of the products or services has been selected for purchase by the user 110. It is also noted that at this point in the process, the user 110 could leave the on-line experience and go to a brick and mortar store in order to complete a purchase of the one or more products or services that were displayed during the augmented reality experience. In the on-line scenario, the web browser 100E can detect events such as, but not limited to, double-clicks or activation of a button 515 to determine if the user 110 desires to purchase a particular service or product on display. Button 515 can activate a hyperlink which takes the user to another web page.

If the inquiry to decision step 1493 is negative, then the "No" branch is followed back to step 1487. However, it is noted that the "No" branch in this step is not limited to returning to step 1487. The "No" branch in this step could take the process back to any other step, such as decision step 1460. If the inquiry to decision step 1493 is positive, then the "Yes" branch is followed to step 1494 in which the user 110 may be prompted to enter the token identifier associated with the stored value card 101 or if the user 110 at a terminal, the user 110 can scan the machine-readable code with a reader.

In step 1496, a value from the stored value account associated with the stored value token can be retrieved in exchange for the one or more goods or services selected for purchase by the user 110. In optional step 1498, additional value may be received to add to the stored value account associated with the stored value token 101. The process 1400 then ends.

Alternative embodiments for the method 1400 and system 102 for creating an augmented reality experience in connection with a stored value token 101 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention.

What is claimed is:

1. A method for creating an augmented reality experience comprising:
    capturing streaming video images of a stored value token with a camera coupled to a client device, the stored value token including a machine-readable code encoding a token identifier associated with a stored-value account;
    displaying the streaming video images on a display device which is coupled to the client device;
    scanning the video images for a marker present on the stored value token;
    determining a position of the marker relative to the camera from the video images; and
    generating and displaying on the display device an object having perspective adjacent to the marker in the streaming video images after the marker is in a predetermined position relative to the camera.

2. The method of claim 1, wherein the predetermined position is a first position and the object is a first object, wherein when the marker is in a second position, then generating and displaying a second object that contains a graphical item, the second object not having perspective.

3. The method of claim 1, further comprising transmitting a token identifier associated with a stored value token over a computer network.

4. The method of claim 2, further comprising receiving data with the client device which includes information for creating the augmented reality experience and a record comprising the graphical item, the graphical item representing one of a product and service.

5. The method of claim 2, further comprising determining if the marker has been removed from a view of the camera.

6. The method of claim 5, wherein if the camera detects the marker leaving a view of the camera and then being reintroduced into the view, then displaying the second object adjacent to the marker.

7. The method of claim 1, further comprising determining if a screen pointer has interacted with the object.

8. The method of claim 7, wherein if the screen pointer has interacted with the object, then displaying additional information about a graphical item contained within the object.

9. The method of claim 8, wherein the additional information comprises one of text and an image related to the graphical item.

10. The method of claim 1, further comprising determining if a graphical item contained within the object has been selected for purchase.

11. The method of claim 10, wherein if the graphical item has been selected for purchase, then retrieving value from the stored value account in exchange for purchase of the selected graphical item.

12. The method of claim 1, further comprising receiving additional value to add to the stored value account.

13. The method of claim 1, further comprising if the marker is removed and then reintroduced into a view of the camera, then generating and displaying the object adjacent to the marker and containing a graphical item that is associated with a price that is close to a value associated with the stored value token.

14. A computer system for creating an augmented reality experience on a display device, comprising:
    a processing unit;
    a memory storage device;
    a display device coupled to the processing unit for displaying data; and
    a program module for providing instructions to the processing unit, the processing unit responsive to the instructions of the program module, operable for:
        capturing streaming video images of a stored value token with a camera, the stored value token including a machine-readable code encoding a token identifier associated with a stored-value account;
        displaying the streaming video images on the display device;
        scanning the video images for a marker present on a stored value token;
        determining a position of the marker relative to the camera from the video images; and
        generating and displaying on the display device an object adjacent to the marker and containing a graphical item that is associated with a price that is close to a value associated with the stored value token after the marker is in a predetermined position relative to the camera.

15. The computer system of claim 14, wherein the stored value token comprises one of a gift card, credit card, an atm card, and a debit card.

16. The computer system of claim 14, wherein the marker on the stored value token comprises a first graphical member and a second graphical member, the second graphical member being circumscribed by the first graphical member.

17. The computer system of claim 14, wherein the object comprises a three-dimensional container.

18. The computer system of claim 17, wherein the container contains one or more decorations suggesting a gift context for the stored value token.

19. The computer system of claim 14, wherein the graphical item comprises one of an image and an icon representing at least one of a product and a service that is associated with a price which is one of less than and equal to a value associated with the stored value token.

20. The computer system of claim 14, wherein the system further comprises an instruction for determining if the marker has been removed and reintroduced into a view of the camera, and if the marker been reintroduced into the view, then generating and displaying an object having perspective adjacent to the marker.

* * * * *